United States Patent

Shirochi

[11] Patent Number: 6,075,581
[45] Date of Patent: Jun. 13, 2000

[54] LIQUID CRYSTAL DISPLAY DEVICE INCLUDING A BIREFRINGENT FILTER AND A DIFFRACTIVE FILTER FOR DIFFUSING THE RESULTANT IMAGE

[75] Inventor: Yoshiki Shirochi, Chiba, Japan

[73] Assignee: Sony Corporation, Tokyo, Japan

[21] Appl. No.: 08/864,411

[22] Filed: May 28, 1997

[30] Foreign Application Priority Data

May 31, 1996 [JP] Japan .............................. P08-139313

[51] Int. Cl.[7] .................................................. G02F 1/1335
[52] U.S. Cl. .......................... 349/112; 348/833; 359/594; 359/497
[58] Field of Search ............................. 349/112; 357/494, 357/495, 599; 348/292, 337, 833

[56] References Cited

U.S. PATENT DOCUMENTS

| | | | |
|---|---|---|---|
| 4,100,570 | 7/1978 | Nobutoki | 358/44 |
| 5,048,949 | 9/1991 | Sato et al. | 349/5 |
| 5,471,343 | 11/1995 | Takasugi | 359/494 |
| 5,737,042 | 4/1998 | Shinohara et al. | 349/57 |

Primary Examiner—Kenneth Parkes
Attorney, Agent, or Firm—Jay H. Maioli

[57] ABSTRACT

An image display apparatus and a liquid-crystal display device using such an optical filter for diffusing pixels while suppressing the occurrence of moiré. A diffuser (optical filter) 13 comprising a combination of a diffraction grating 26 and a birefringence plate 27 is disposed on an LCD 11 in an opposing relation to the viewer side. The diffraction grating 26 diffuses each pixel of the LCD 11 into three points in the vertical direction by a shift amount of POy/3 (POy: same color pixel pitch in the vertical direction). Further, the birefringence plate 27 diffuses each diffused pixel into two points in the horizontal direction by a shift amount of Pox/2 (Pox: same color pixel pitch in the horizontal direction). Thus, the diffuser 13 diffuses each pixel of the LCD 11 into six pixels to thereby optically erase a matrix-like pixel pattern. The diffraction grating 26 diffuses pixels by a large shift amount, whereby a total thickness of birefringence plate can be suppressed from increasing as compared with an optical filter for diffusing pixels by use of only a birefringence plate. Since the diffraction grating 26 diffuses pixels by a large shift amount, a grating pitch can be reduced, and the occurrence of moiré can be suppressed.

10 Claims, 11 Drawing Sheets

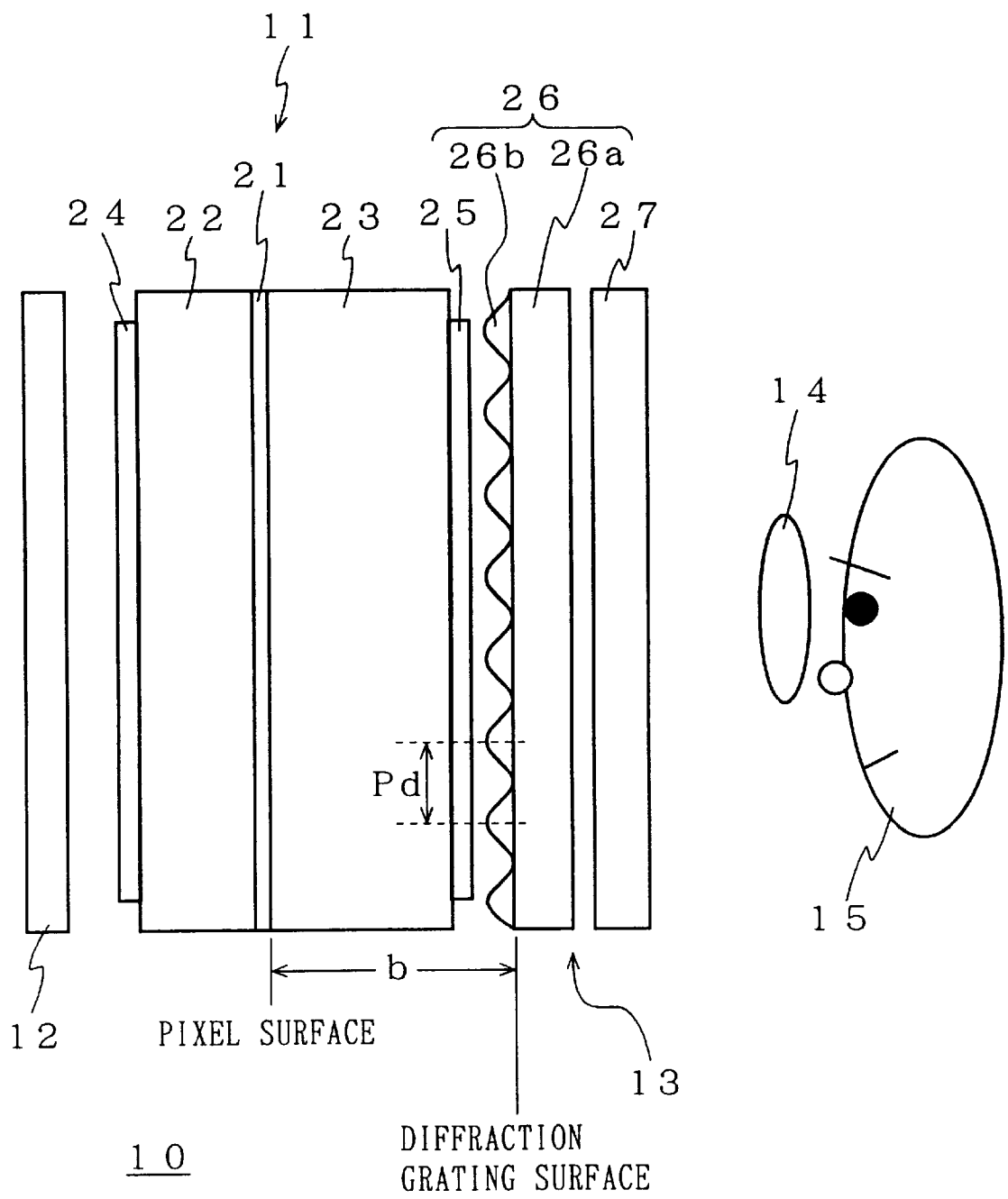

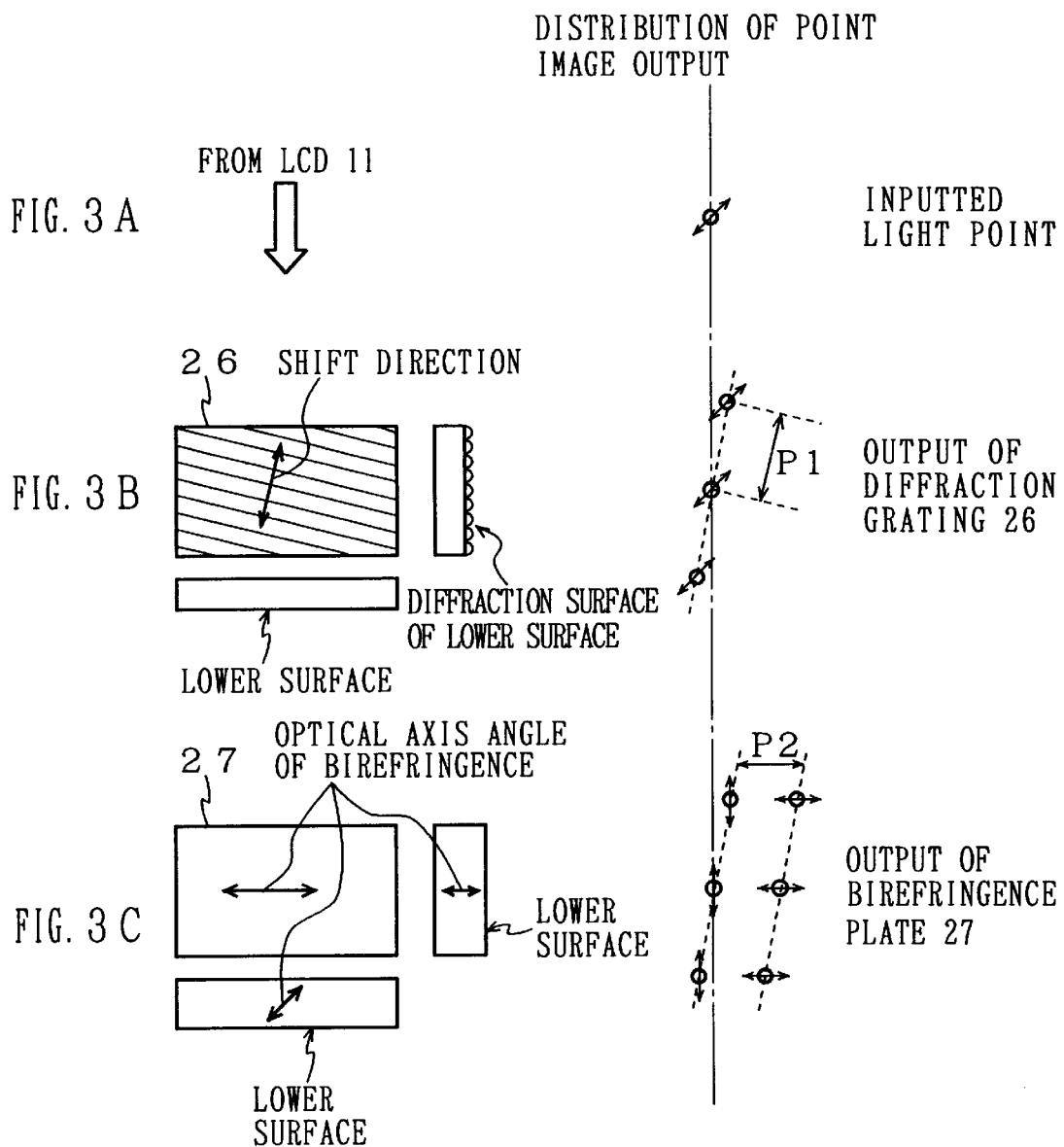

LIQUID CRYSTAL DISPLAY DEVICE INCLUDING A BIREFRINGENT FILTER AND A DIFFRACTIVE FILTER FOR DIFFUSING THE RESULTANT IMAGE

BACKGROUND OF THE INVENTON

1. Field of the Invention

The present invention relates to an optical filter for use in improving a quality of picture by optically erasing a matrix-like pixel pattern such as a liquid-crystal display (LCD) device by diffusing pixels and an image display apparatus and a liquid-crystal display device using such an optical filter. More particularly, the present invention relates to an optical filter or the like capable of an optimum pixel diffusion design by a combination of a diffraction grating and a birefringence plate while suppressing the occurrence of moiré.

2. Description of the Related Art

Image display apparatus using a display device such as a liquid-crystal display device comprising arrays of a plurality of pixels have to increase the number of pixels in order to increase a resolution. The image display apparatus, however, cannot increase the number of pixels and reduce a space between pixels excessively from a standpoint of yield in production.

For this reason, if this kind of image display apparatus displays a large picture, a matrix-like pixel pattern based on a space between pixels (e.g. LCD black stripe portion) becomes conspicuous and a displayed picture becomes difficult for a viewer to see. In this kind of color image display apparatus, color filters of three primary colors (R, G, B) are arranged at a predetermined repetitive cycle in response to pixels. If this kind of color image display apparatus displays a large picture, a cycle in which a same color filter is disposed, i.e. same color dot cycle becomes conspicuous, and hence a displayed picture becomes difficult to see for the viewer.

CCD (charge-coupled device) cameras use an optical filter based on a double refraction (birefringence), and a space between pixels can be made inconspicuous by an electrical processing done by the low-pass filter.

On the other hand, since the image display apparatus using the display device in which a plurality of pixels are arrayed has to fill the space between the pixels after a signal was converted into a light signal, in actual practice, it is impossible to make the matrix-like pixel pattern and the same color dot cycle by the electrical processing. Although there is known a method of blurring a focus of a lens on the viewer side, such method is not preferable because a signal also is blurred together with the focus of the lens.

Heretofore, there has been a method of improving a quality of picture by optically erasing the matrix-like pixel pattern and the same color dot cycle based on the diffusion of pixels. In this method, there is used an optical filter comprising a diffraction grating or a birefringence plate attached to the front of the display device such as the liquid-crystal display device wherein each pixel of the display device is diffused into a plurality of pixels thereby to cancel the matrix-like pixel pattern and the same color dot cycle out optically, thus resulting in a quality of picture being improved.

However, when the diffraction grating is used as the optical filter, if the position at which the diffraction grating is mounted on the display device is determined, the grating pitch of the diffraction grating cannot be selected freely, thereby making it difficult to decrease a moiré. This disadvantage can be avoided based on a difference between the moiré and the focusing position on the image surface. However, if a viewer watches a picture through a lens having a small magnification, for example, and which has a small focus depth or a picture is displayed by an image display apparatus such as a spectacles-type monitor of which the focus is fixed, when an image is not properly focused, it is unavoidable that a moiré becomes conspicuous.

Since the diffraction grating diffuses each pixel into three points at the lowest, if the display device of the image display apparatus has a number of pixels and it is not desired to increase the number of diffusions, it is not preferable to use the diffraction grating. Moreover, when a shift amount (length between adjacent diffusion points) is small, the grating pitch of the diffraction grating is widened so that an image distortion (matrix like distortion) caused by the cycle interval becomes conspicuous.

When a birefringence plate is used as an optical filter, if a shift amount is large, the thickness of the birefringence plate increases so that the optical filter becomes expensive. In particular, a crystal composing the low-pass filter used in the above-mentioned CDD camera has a small refractive index anisotropy. Therefore, when a birefringence material making the birefringence plate is a crystal, the thickness of the birefringence plate increases excessively, which is not suitable in actual practice.

Furthermore, since the birefringence plate diffuses each pixel into two points, if it is intended to increase the number of diffusions, the number of the birefringence plates also increases. As a result, the thickness of the birefringence plate increases excessively, which makes the optical filter expensive.

SUMMARY OF THE INVENTION

It is therefore an object of the present invention to provide an optical filter and an image display apparatus and a liquid-crystal device using such an optical filter capable of making an optimum pixel diffusion design while suppressing the occurrence of moiré.

An optical filter according to the present invention is an optical filter disposed on the viewer side of a display device having a matrix-like pixel pattern. This optical filter comprises a combination of one or a plurality of diffraction gratings and one or a plurality of birefringence plates.

An image display apparatus according to the present invention includes a display device having a matrix-like pixel pattern and an optical filter disposed on the viewer side of this display device, the optical filter comprising a combination of one or a plurality of diffraction gratings and one or a plurality of birefringence plates.

Each pixel of the display device is diffused by one or a plurality of diffraction gratings in the vertical and horizontal directions, and also diffused by one or a plurality of birefringence plates in the vertical and horizontal directions. That is, each pixel of the display device is diffused with a predetermined diffused number by the optical filter in the vertical and horizontal directions. Thus, the matrix-like pixel pattern of the display device is optically erased by the diffusion of pixels.

As another aspect of the present invention, there is provided a liquid-crystal display device in which a pair of substrates are disposed across a liquid-crystal layer. In this liquid-crystal display device, a diffraction grating for diffusing pixels is integrally formed into one transparent substrate of the pair of substrates in an opposing relation to the viewer side.

Each pixel of the liquid-crystal display device is diffused by the diffraction grating integrally formed into the transparent substrate in an opposing relation to the viewer side in the vertical and horizontal directions so that the matrix-like pixel pattern is optically erased by the diffusion of pixels.

BRIEF DESCRIPTION OF THE DRAWINGS

FIG. 1 is a schematic diagram showing an electronic viewfinder according to a first embodiment of the present invention;

FIGS. 3A through 3C are schematic diagrams showing a principle of pixel diffusion according to the first embodiment of the present invention;

DETAILED DESCRIPTION OF THE PREFERRED EMBODIMENTS

Figure 2A:
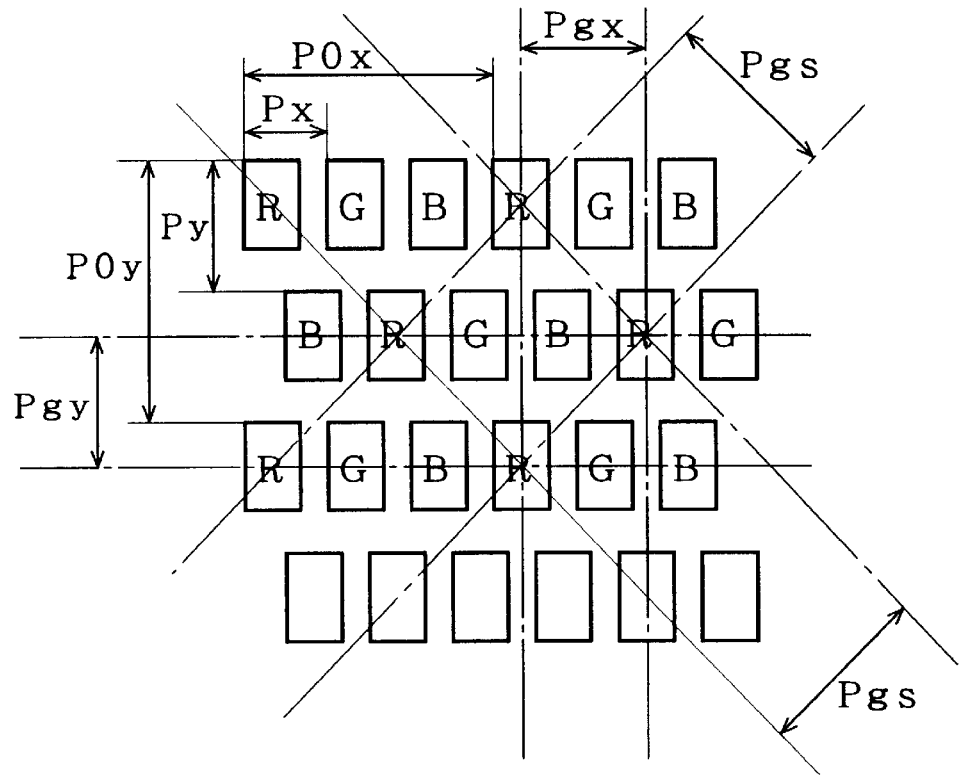
FIGS. 2A and 2B are schematic diagrams showing a checkered pixel pattern of a liquid-crystal display device.

The present invention will hereinafter be described with reference to the drawings.

FIG. 1 of the accompanying drawings is a schematic diagram showing an electronic viewfinder (EVF) according to a first embodiment of the present invention.

An electronic viewfinder, generally depicted at reference numeral 10 in FIG. 1, comprises a liquid-crystal display (LCD) device such as a display device having a matrix-like pixel pattern, a backlight 12 for brightening the display of the liquid-crystal display device 11 by illuminating the liquid-crystal display device 11 from behind, a diffuser 13 disposed on the viewer side of the liquid-crystal display device 11 as an optical filter for diffusing each pixel of the liquid-crystal display device 11 and an eyepiece (magnifying lens) 14 disposed on the viewer side of the diffuser 13.

As shown in FIG. 1, the liquid-crystal display device 11 comprises a liquid-crystal layer portion 21 in which a common electrode and pixel electrodes are disposed across a liquid-crystal layer and R, G, B (red, green, blue) color filters are located at a predetermined repetitive cycle in response to respective pixel electrodes, glass substrates 22, 23 disposed across the liquid-crystal layer portion 21, a sheet polarizer 24 deposited on the glass substrate 22 in an opposing relation to the backlight 12 and a sheet polarizer 25 deposited on the glass substrate 23 in an opposing relation to the surface of the diffuser 13.

The diffuser 13 comprises a combination of a diffraction grating 26 composed of a glass substrate 26 a whose grating surface 26b is formed on the glass substrate 26a by a photosensitive resin in an opposing relation to the liquid-crystal display device 11 and a birefringence plate 27 disposed on the diffraction grating 26 in an opposing relation to the eyepiece 14 side. The birefringence plate 27 is made of a birefringence material having a high refractive index anisotropy, e.g. lithium niobate (LN). The glass substrate 26a and the grating surface 26b comprising the diffraction grating 26 might be unitarily formed as one body with each other.

The following table 1 shows components of crystal, rutile and lithium niobate making the birefringence material, refractive index no of ordinary rays of light and refractive index ne of extraordinary rays of light and so on.

TABLE 1

|  | crystal | lithium niobate (LN) | rutile | remarks |
|---|---|---|---|---|
| component | $SiO_2$ | $LiNbO_3$ | $TiO_2$ |  |
| refractive index no | 1.546 | 2.315 | 2.648 | $\lambda$ = 550 nm |
| refractive index ne | 1.555 | 2.227 | 2.953 | $\lambda$ = 550 nm |
| total thickness t | 11.25 mm | 1.72 mm | 0.61 mm | (three in total) |
| relative value | 1.0 | 1/6.6 | 1/18.4 |  |

Study of the table 1 reveals that the thickness of the lithium niobate maybe 1/6.6 and the thickness of the rutile maybe 1/18.4 with respect to the thickness of the crystal in order to obtain the same shift amount (length between adjacent diffusion points). Incidentally, the total thickness on the above table 1 shows a total thickness of three birefringence plates in a second embodiment which will be described later on.

Figure 2B:
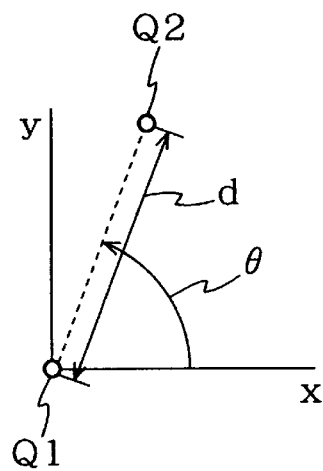

FIG. 2A illustrates a pixel pattern (checkered pixel pattern) of the liquid-crystal display device 11. As shown in FIG. 2, with respect to a horizontal direction x, a pixel size becomes Px, a same color pixel pitch becomes Pox, and a same color pixel cycle becomes Pgx. Similarly, with respect to a vertical direction y, a pixel size becomes Py, a same color pixel pitch becomes Poy, and a same color pixel cycle becomes Pgy. A same color pixel cycle in the oblique direction becomes Pgs. When a certain pixel in the liquid-crystal display device 11 is diffused into pixels Q1 and Q2 as shown in FIG. 2B, a shift amount (length between adjacent diffusion points) becomes d, and a shift direction becomes θ.

In this embodiment, the sheet polarizer 25 of the liquid-crystal display device 11 has a polarizing direction set to 45° as shown on the table 2 below.

TABLE 2

| polarizing direction | 45° |
|---|---|
| pixel size | Px = 18 μm, Py = 47.5 μm |
| same color pixel pitch | POx = 54 μm, POy = 95 μm |
| same color pixel cycle | Pgx = 27.5 μm, Pgy = 47.5 μm |

As is clear from the above table 2, the pixel pattern of the liquid-crystal display device 11 is presented as Px=18 μm, Py=47.5 μm with respect to the pixel size and also presented as Pox=54 μm, and Poy=95 μm with respect to the same color pixel pitch and Pgx=27.5 μm and Pgy=47.5 μm with respect to the same color pixel cycle, respectively.

In this embodiment, the diffraction grating 26 and the birefringence plate 27 comprising the diffuser 13 are arranged as shown on the table 3 below.

TABLE 3

| | shift amount | shift direction | thickness | grating pitch Pd | optical length | remarks |
|---|---|---|---|---|---|---|
| (1) diffraction grating 26 | 31.7 μm | 82° | — | 18 μm | 1.00 mm | rotated 8° in order to prevent moiré |
| (2) birefringence plate 27 (lithium niobate) | 27 μm | 0° | 0.699 mm | — | — | |

Specifically, with respect to the diffraction grating 26, the grating surface 26b is formed such that the shift direction becomes 82° and that the grating pitch Pd becomes 18 μm. Also, the diffraction grating 26 is disposed such that the optical length b from the pixel surface to the diffraction grating surface becomes 1.00 mm.

Thus, the diffraction grating 26 becomes able to diffuse each pixel at three points in substantially the vertical direction (82°) in such a manner that the shift amount becomes 31.7 μm (⅓ of the same color pixel pitch POy in the vertical direction y). Incidentally, the reason that the shift direction is 82° and that the diffraction grating 26 is rotated 8° from the vertical direction y is to prevent a moiré.

Furthermore, with respect to the birefringence plate 27, lithium niobate is used as the birefringence material. Also, an optical axis angle of the birefringence plate 27 is set in such a manner that the shift direction becomes 0° with respect to light (linearly-polarized light) outputted from each pixel of the liquid-crystal display device 11. Moreover, the birefringence plate 27 becomes 0.699 mm in thickness. Thus, the birefringence plate 27 becomes able to diffuse each pixel at two points in the horizontal direction x in such a manner that the shift amount becomes 27 μm (½ of the same color pixel pitch Pox in the horizontal direction x).

An operation of the electronic viewfinder 10 shown in FIG. 1 will be described next.

Light outputted from the backlight 12 is introduced into the electronic viewfinder 10 from the rear of the liquid-crystal display device 11. In this case, the sheet polarizer 24 polarizes the light outputted from the backlight 12 to provide linearly-polarized light, and the liquid-crystal layer portion 21 rotates a plane of polarization of each pixel portion of the linearly-polarized light in response to a magnitude corresponding to the level of pixel signals comprising a video signal. Therefore, the sheet polarizer 25 of the liquid-crystal display device 11 emits linearly-polarized light (polarizing direction is 45°) whose intensity is modulated at every pixel, and this liquid-crystal display device 11 displays an image corresponding to a video signal.

In the electronic viewfinder 10 shown in FIG. 1, each pixel in the liquid-crystal display device 11 is diffused by the diffraction grating 26 comprising the diffuser 13 into three pixels in substantially the vertical direction (direction of 82°) in such a manner that the shift amount (length between adjacent diffusion points) becomes ⅓ of the same color pixel pitch POy in the vertical direction y. Furthermore, each pixel that had been diffused by the diffraction grating 26 is diffused by the birefringence plate 27 comprising the diffuser 13 into two pixels in the horizontal direction x in such a manner that the shift amount becomes ½ of the same color pixel pitch Pox in the horizontal direction x. Because an angle between the shift direction and the incident polarized light is 45°, it is not necessary to use a quarter-wave phase difference film which converts incident light into circularly-polarized light. Thus, each pixel of the liquid-crystal display device 11 is diffused by the diffuser 13 into six pixels, which can be viewed by the viewer 15 through the eyepiece 14.

FIGS. 3A through 3C illustrate the principle in which the diffuser 13 diffuses each pixel. In the diffuser 13, the diffraction grating 26 diffuses a point image output of inputted light point (pixel of the liquid-crystal display device 11) shown in FIG. 3A into three points by a shift amount P1 (=POy/3) in substantially the vertical direction y (direction of 82°) as shown in FIG. 3B. In this case, although an arrow of point image output shows the polarized direction, the direction in which the point image outputted from the diffraction grating 26 is polarized becomes 45° similarly to the direction in which the point image output of the inputted light point is polarized. Therefore, as shown in FIG. 3C, the birefringence plate 27 shifts only the linearly-polarized component of the horizontal direction x of the point image output of the diffraction grating 26 by the shift amount P2 (=Pox/2) in the horizontal direction x. As a result, the diffuser 13 diffuses each pixel of the liquid-crystal display device 11 into six pixels.

As described above, in the electronic viewfinder shown in FIG. 1, each pixel of the liquid-crystal display device 11 is diffused by the diffuser 13 into six pixels so that the matrix-like pixel pattern and the same color dot cycle are optically canceled out by the diffusion of pixels, thereby resulting in a quality of picture being improved. In this case, since the diffraction grating 26 is adapted to diffuse each pixel by a large shift amount, the total thickness of the birefringence plate can be suppressed from increasing, and hence the optical filter can be made inexpensive as compared with an optical filter using only the birefringence plate to diffuse pixels.

Furthermore, since the diffraction grating 26 is able to diffuse each pixel of the vertical direction y by the large shift amount, the grating pitch Pd can be reduced, and the occurrence of moiré can be suppressed.

In general, a pixel cycle (same color pixel cycle) Pg of the liquid-crystal display (LCD) device and a moiré cycle Pm generated from the grating pitch (pitch) of the diffraction grating are expressed by the following equation (1):

$$|n/Pg - m/Pd| = 1/Pm \qquad (1)$$

where $n$ and $m$ are natural numbers.

A diffuser is disposed in order to cancel the matrix-like pixel pattern out. Thus, even if there occurs a moiré, the moiré cycle has to be made smaller than the pixel cycle Pg, i.e. Pm<Pg. Therefore, the following equations (2) and (3) are established:

$$Pd/m > Pg/(n-1) \text{ where } n/Pg - m/Pd > 0 \text{ is satisfied.} \qquad (2)$$

$$Pd/m < Pg/(n+1) \text{ where } n/Pg - m/Pd < 0 \text{ is satisfied.} \qquad (3)$$

If the grating pitch of the diffraction grating is a sinusoidal one, then m=1. Moreover, in order to prevent the grating pitch Pd from directly becoming conspicuous, the grating pitch Pd should preferably be made smaller than the pixel cycle Pg. That is, Pd<Pg, and thus the following equation (4) is established:

$$Pd<Pg/(n+1) \quad (4)$$

In particular, since the fundamental mode where n=1 is large in intensity of moiré, such fundamental mode is a condition that should be avoided as the cycle of the diffraction grating, thereby yielding the following equation (5):

$$Pd<Pg/2 \quad (5)$$

In general, the shift amount P in which light is shifted by the diffraction grating is calculated from the light wavelength λ, the grating pitch Pd and the optical length b by the following equation (6):

$$P=\lambda*b/Pd \quad (6)$$

As is clear from the above-mentioned equation (6), the grating pitch Pd increases in inverse proportion to the shift amount P. If it is intended to reduce the grating pitch Pd in order to prevent a moiré, it is necessary to reduce the optical length b by placing the position at which the diffraction grating is mounted near to the liquid-crystal display device.

In the electronic viewfinder 10 shown in FIG. 1, the grating pitch Pd of the diffraction grating 26 is 18 μm and less than ½ of the same color pixel cycle Pgy=47.5 μm of the vertical direction y. Thus, this grating pitch Pd of the diffraction grating 26 satisfies the above-mentioned equation (5), and it is to be appreciated that the occurrence of moiré can be suppressed satisfactorily.

Furthermore, since the birefringence plate 27 is made of lithium niobate of which the refractive index anisotropy is high, there is then the advantage that the total thickness of the birefringence plate can be suppressed much more. However, inasmuch as the birefringence plate made of lithium niobate has a large surface reflection as compared with a birefringence plate made of crystal, a transmittance is deteriorated, a contrast is deteriorated due to a reflection on the inner surface, and coloring occurs due to a poor wavelength characteristic. For this reason, although not shown, the surface on which the birefringence plate 27 is exposed is treated by surface reflection preventing thin film treatment (i.e. antireflection film coating (AR coating), and the color blur can be avoided by flattening a transmittance within a visible light band by adjusting a wavelength characteristic of the AR coating.

Figure 4:
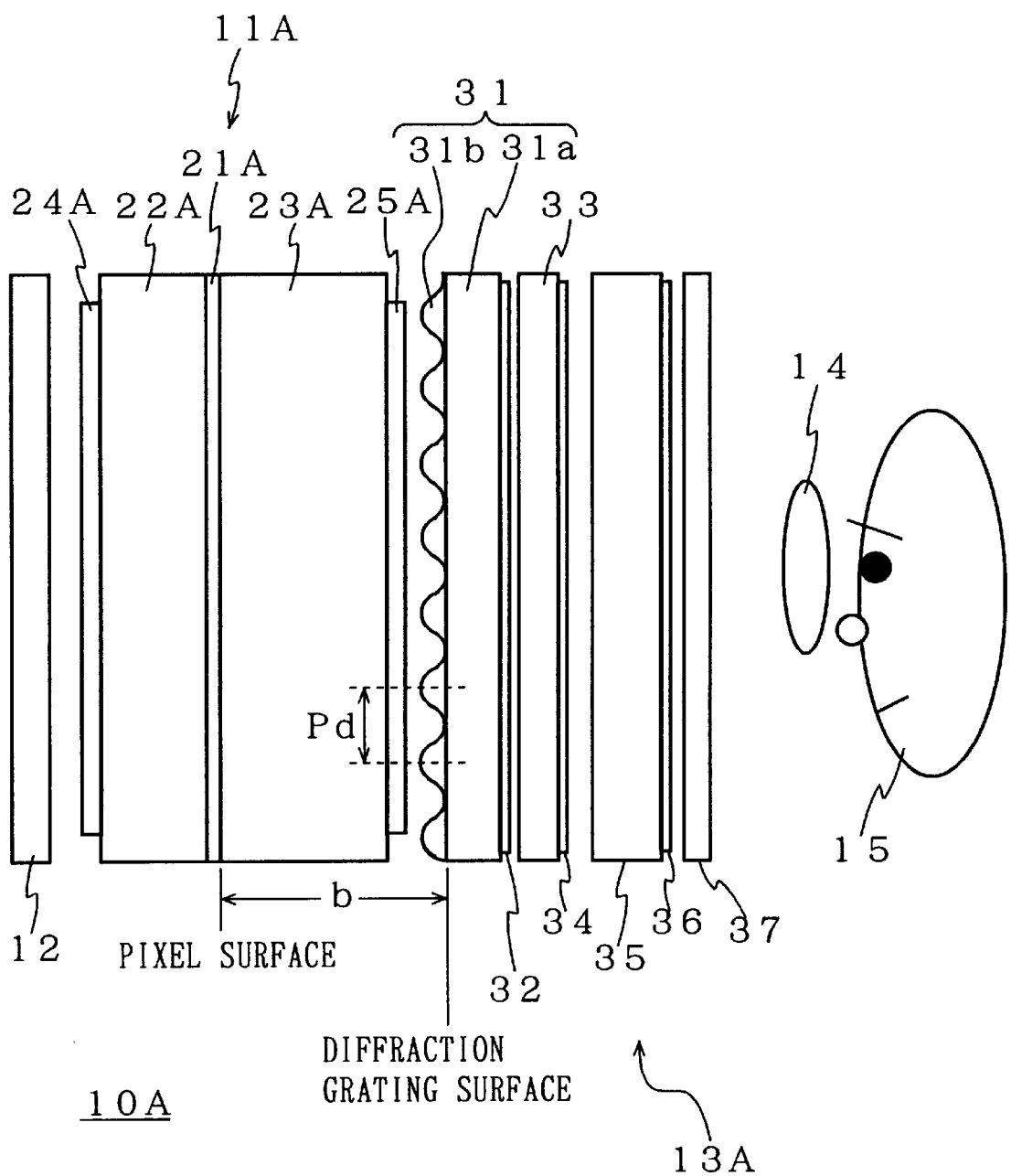
FIG. 4 is a schematic diagram showing an electronic viewfinder according to a second embodiment of the present invention.

FIG. 4 shows an electronic viewfinder (EVF) 10A according to a second embodiment of the present invention. In FIG. 4, like elements and parts corresponding to those of FIG. 1 are marked with the same references and therefore need not be described in detail.

As shown in FIG. 4, the electronic viewfinder 10A comprises a liquid-crystal display (LCD) device 11A serving as a display device having a matrix-like pixel pattern, the backlight 12 for brightening the display of the liquid-crystal display device 11A by illuminating the liquid-crystal display device 11A from the backward, a diffuser 13A disposed in the liquid-crystal display device 11A in an opposing relation to the viewer side as an optical filter for diffusing each pixel of the liquid-crystal display device 11A and the eyepiece (magnifying lens) 14 located in the diffuser 13A in an opposing relation to the viewer side.

As shown in FIG. 4, the liquid-crystal display device 11A comprises a liquid-crystal layer portion 21A, glass substrates 22A, 23A and sheet polarizers 24A, 25A in the same way as the liquid-crystal display device 11 in the electronic viewfinder 10 shown in FIG. 1. In this liquid-crystal display device 11A, the polarizing direction of the sheet polarizer 25A is set to 90° as shown on the table 4 below.

TABLE 4

| polarizing direction | 90° |
|---|---|
| pixel size | Px = 28 μm, Py = 35 μm |
| same color pixel pitch | Pox = 84 μm, POy = 70 μm |
| same color pixel cycle | Pgx = 42 μm, Pgy = 35 μm |

Moreover, as shown on the above-mentioned table 4, the liquid-crystal display device 11A is arranged such that the pixel size is presented as Px=28 μm and Py=35 μm, the same color pixel pitch is presented as Pox=84 μm and POy =70 μm and that the same color pixel cycle is presented as Pgx =42 μm and Pgy =35 μm.

As illustrated in FIG. 4, the diffuser 13A comprises a diffraction grating 31 whose a grating surface 31b made of a photosensitive resin, for example, is located in an opposing relation to the liquid-crystal display device 11A of the glass substrate 31a, a quarter-wave phase difference film (quarter-wave plate) 32 deposited on the diffraction grating 31 in an opposing relation to the eyepiece 14 so as to convert linearly-polarized light (linearly-polarized wave) into circularly-polarized light (circularly-polarized wave), a birefringence plate 33 disposed on the quarter-wave phase difference film 32 in an opposing relation to the eyepiece 14, a quarter-wave phase difference film 34 deposited on the birefringence plate 33 in an opposing relation to the eyepiece 14 so as to convert linearly-polarized light into circularly-polarized light, a birefringence plate 35 disposed on the quarter-wave phase difference film 34 in an opposing relation to the eyepiece 14, a quarter-wave phase difference film 36 deposited on the birefringence plate 35 in an opposing relation to the eyepiece 14 so as to convert linearly-polarized light into circularly-polarized light, and a birefringence plate 37 disposed on the quarter-wave phase difference film 36 in an opposing relation to the eyepiece 14.

The birefringence plates 33, 35 and 37 are each made of a birefringence material having a high refractive index anisotropy, such as lithium niobate (LN). The birefringence plates 33, 35 and 37 are treated by surface reflection preventing thin film coating (AR coating) on their surfaces in which they are exposed. Also, the surfaces in which the birefringence plates 33, 35 and 37 are contacting with the quarter-wave phase difference films are similarly treated by AR coating in accordance with a refractive index (e.g. n=1.5) of the quarter-wave phase difference film so that the deterioration of transmitance due to the large surface reflection can be prevented. Furthermore, a color blur can be canceled out by flattening the transmittance within the visible light band by adjusting the wavelength characteristic of the AR coating.

In the second embodiment, the diffraction grating 31, the quarter-wave phase difference plates 32, 34, 36 and the birefringence plates 33, 35, 37 composing the diffuser 13A are arranged as shown on the following table 5.

TABLE 5

| | shift amount | shift direction | thickness | grating pitch Pd | optical length b | phase delay axis |
|---|---|---|---|---|---|---|
| (1) diffraction grating (31) | 28 μm | 0° | — | 19.8 μm | 1.00 mm | — |

TABLE 5-continued

| | shift amount | shift direction | thickness | grating pitch Pd | optical length b | phase delay axis |
|---|---|---|---|---|---|---|
| (2) quarter-wave phase difference film 32 | — | — | — | — | — | 45° |
| (3) birefringence plate 33 (lithium niobate) | 17.5 μm | 90° | 0.453 mm | — | — | — |
| (4) quarter-wave plate phase difference film 34 | — | — | — | — | — | 45° |
| (5) birefringence plate 35 (lithium niobate) | 35 μm | 90° | 0.95 mm | — | — | — |
| (6) quarter-wave plate phase difference film 36 | — | — | — | — | — | −45° |
| (7) birefringence plate 37 (lithium niobate) | 14 μm | 0° | 0.362 mm | — | — | — |

Specifically, the grating surface 31b of the diffraction grating 31 is formed such that the shift direction becomes 0° and that the grating pitch Pd becomes 19.8 μm. Also, the diffraction grating 31 is disposed such that the optical length b from the pixel surface to the diffraction grating surface becomes 1.00 mm. Thus, the diffraction grating 31 becomes able to diffuse each pixel into three points in the horizontal direction x so that the shift amount becomes 28 μm (⅓ of the same color pixel pitch Pox of the horizontal direction x).

With respect to the birefringence plate 33, lithium niobate is used as the birefringence material, and the optical axis angle thereof is set in such a manner that the shift direction becomes 90° relative to the linearly-polarized component in the vertical direction x of light (circularly-polarized light) outputted from the quarter-wave phase difference film 32 which has the delay phase axis of 45°. Also, the thickness of the birefringence plate 33 becomes 0.453 mm. Thus, the birefringence plate 33 becomes able to diffuse each pixel into two points in the vertical direction y in such a manner that the shift amount becomes 17.5 μm (¼ of the same color pixel pitch POy of the vertical direction y).

With respect to the birefringence plate 35, lithium niobate is used as the birefringence material, and the optical axis angle thereof is set in such a manner that the shift direction becomes 90° relative to the linearly-polarized component in the vertical direction y of light (circularly-polarized wave) outputted from the quarter-wave phase difference film 34 of which the delay phase axis is 45°. Also, the birefringence plate 35 becomes 0.905 mm in thickness. Thus, the birefringence plate 35 becomes able to diffuse each pixel into two points in the vertical direction in such a manner that the shift amount becomes 35 μm (½ of the same color pixel pitch POy of the vertical direction y).

Furthermore, with respect to the birefringence plate 37, lithium niobate is used as the birefringence material, and the optical axis angle thereof is set in such a manner that the shift direction becomes 0° relative to the linearly-polarized light component in the horizontal direction x of light (circularly-polarized light) outputted from the quarter-wave phase difference film 36 of which the delay phase axis is −45°. Also, the birefringence plate 37 becomes 0.362 mm in thickness. Thus, the birefringence plate 37 becomes able to diffuse each pixel into two points in the horizontal direction x in such a manner that the shift amount becomes 14 μm (⅙ of the same color pixel pitch Pox of the horizontal direction x).

An operation of the electronic viewfinder 10A shown in FIG. 4 will be described next.

Light outputted from the backlight 12 is introduced into the liquid-crystal display device 11A from behind. In this case, the sheet polarizer 24A converts the light outputted from the backlight 12 into linearly-polarized light, and the liquid-crystal layer portion 21A rotates the plane of polarization of each pixel portion of the linearly-polarized light with a magnitude corresponding to the level of pixel signals comprising a video signal. Therefore, linearly-polarized light (polarizing direction is 90°), which is modulated in intensity at every pixel, is emitted from the sheet polarizer 25A of the liquid-crystal display device 11A, and this liquid-crystal display device 11A displays an image corresponding to the video signal.

Then, in the electronic viewfinder 10A shown in FIG. 4, the diffraction grating 31 comprising the diffuser 13A diffuses each pixel of the liquid-crystal display device 11A into three pixels in the horizontal direction x in such a manner that the shift amount (length between adjacent diffusion points) becomes ⅓ of the same color pixel pitch POx in the horizontal direction x.

Further, the birefringence plate 33 diffuses each pixel, which had been diffused by the diffraction grating 31, into two pixels in the horizontal direction y in such a manner that the shift amount becomes ¼ of the same color pixel pitch POy in the vertical direction y. Furthermore, the birefringence plate 35 diffuses each pixel, which had been diffused by the birefringence plate 33, into two pixels in the vertical direction y in such a manner that the shift amount becomes ½ of the same color pixel pitch POy in the vertical direction y. Therefore, the two birefringence plates 33 and 35 diffuse each pixel, which had been diffused by the diffraction grating 31, into four pixels in the vertical direction y in such a manner that the shift amount becomes ¼ of the same color pixel pitch POy in the vertical direction y.

Furthermore, the birefringence plate 37 diffuses each pixel, which had been diffused by the birefringence plates 33, 35, into two pixels in the horizontal direction x in such a manner that the shift amount becomes ⅙ of the same color pixel pitch Pox in the horizontal direction x. Thus, the diffuser 13A diffuses each pixel of the liquid-crystal display device 11A into 24 pixels, which can be viewed by the viewer 15 through the eyepiece 14.

Figure 5:
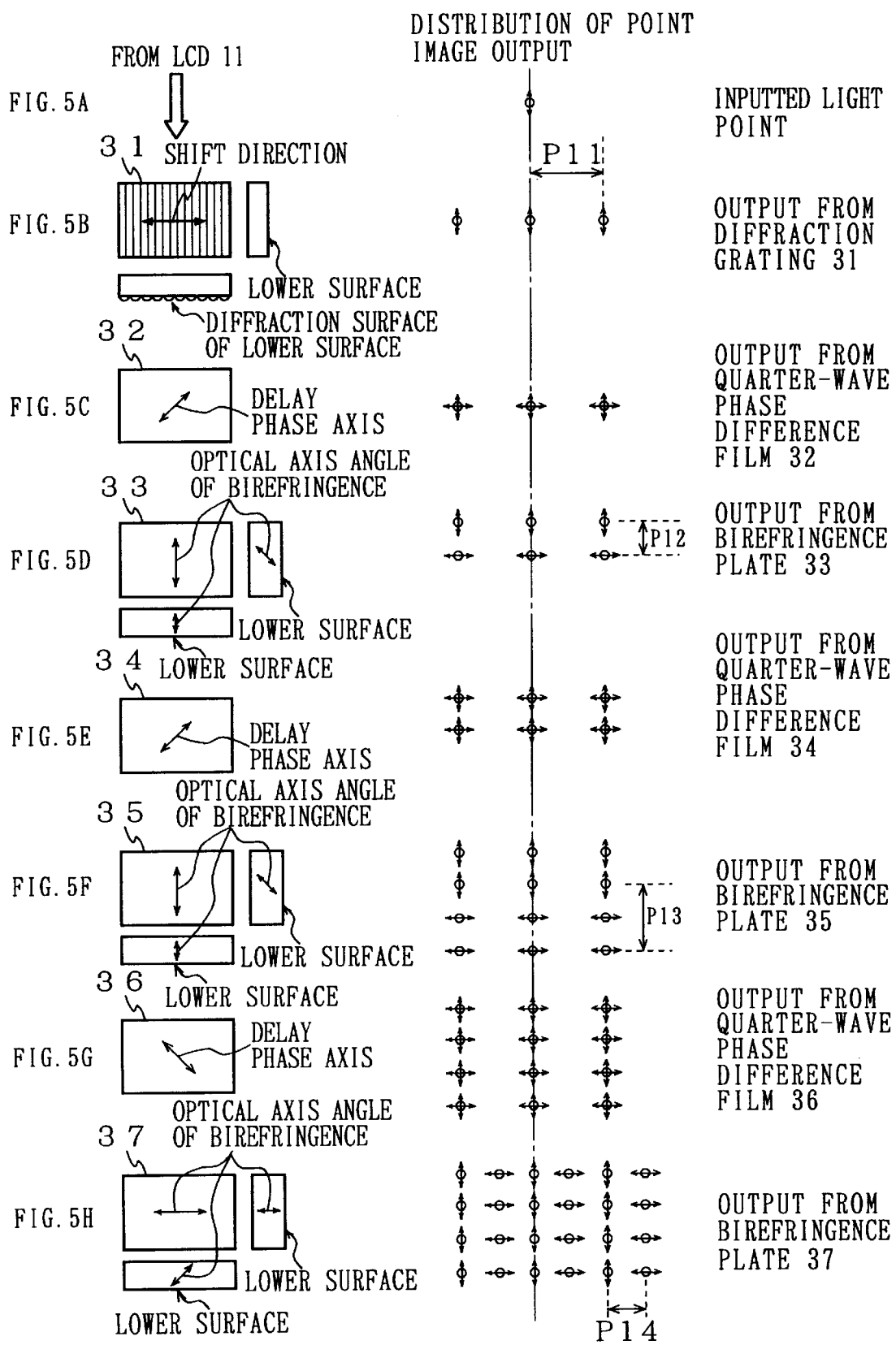
FIGS. 5A through 5H are schematic diagrams showing a principle of pixel diffusion according to the second embodiment of the present invention.

FIGS. 5A through 5H are respectively schematic views used to explain the principle in which pixels are diffused by the diffuser 13A. The diffraction grating 31 diffuses a point image output of inputted light point (pixel of the liquid-crystal display device 11A) shown in FIG. 5A into three points in the horizontal direction x with a shift amount P11 (=Pox/3) as shown in FIG. 5B. In this case, although the arrow of the point image output shows the polarizing direction, the direction in which the point image output is polarized by the diffraction grating 31 becomes the direction of 90° similarly to the direction in which the point image output at the input light point is polarized. Then, as shown in FIG. 5C, the quarter-wave phase difference film 32 which has the delay phase axis inclined at an inclination angle of 45° relative to the polarizing direction converts the linearly-polarized light outputted from the diffraction grating 31 into circularly-polarized light.

As shown in FIG. 5D, the birefringence plate 33 receives the point image output of the quarter-wave phase difference film 32 and shifts only the linearly-polarized component of the vertical direction y by the shift amount P12 (=POy/4) in the vertical direction y with the result that the point image output of the quarter-wave phase difference film 32 is diffused into two points. Then, as shown in FIG. 5E, the quarter-wave phase difference film 34 having the delay phase axis with an inclination angle of 45° with respect to the polarizing direction converts linearly-polarized light outputted from the birefringence plate 33 into circularly-polarized light.

As shown in FIG. 5F, the birefringence plate 35 receives the point image output of the quarter-wave phase difference film 34 and shifts only the linearly-polarized component of the vertical direction y by a shift amount P13 (=POy/2) in the vertical direction y with the result that the point image output from the quarter-wave phase difference film 34 is diffused into two points. Then, as shown in FIG. 5G, the quarter-wave phase difference film 36 having the delay phase axis with the inclination angle of 45° with respect to the polarizing direction converts the linearly-polarized light outputted from the birefringence plate 35 into circularly-polarized light.

Furthermore, as shown in FIG. 5H, the birefringence plate 37 receives the point image output of the quarter-wave phase difference film 36 and shifts only the linearly-polarized component of the horizontal direction x by a shift amount P14 (=POy/6) in the horizontal direction with the result that the point image output from the quarter-wave phase difference film 36 is diffused into two points. Thus, the diffuser 13A diffuses each pixel of the liquid-crystal display device 11A into 24 pixels.

As described above, in the electronic viewfinder 10A shown in FIG. 4, the diffuser 13A diffuses each pixel of the liquid-crystal display device 11A into 24 pixels, whereby the matrix-like pixel pattern and the same color dot cycle are optically erased by the diffusion of pixels, resulting in a quality of picture being improved. In this case, since the diffraction grating 31 diffuses pixels of the horizontal direction by the large shift amount similarly to the electronic viewfinder 10 shown in FIG. 1, the total thickness of the birefringence plates can be suppressed from increasing and the optical filter according to this embodiment can be produced inexpensively as compared with the optical filter which diffuses pixels by using only the birefringence plate.

Moreover, since the diffraction grating 31 is able to diffuse pixels by the large shift amount, the grating pitch Pd can be reduced, and hence the occurrence of moiré can be suppressed. In this case, since the grating pitch Pd of the diffraction grating 31 is 19.8 μm and this grating pitch Pd is less than ½ of the same color pixel cycle Pgx=42 μm of the horizontal direction x, the above-mentioned equation (5) can be satisfied, and it is to be appreciated that the occurrence of moiré can be suppressed satisfactorily. Furthermore, since the birefringence plates 33, 35, 37 are each made of lithium niobate of which the refractive index anisotropy is high, there is then the advantage that the total thickness of the birefringence plates can be suppressed much more.

In the diffuser 13A in the electronic viewfinder 10A shown in FIG. 4, the pixels that had been diffused by the birefringence plates 33, 35 are further diffused by the birefringence plate 37 into two pixels in the horizontal direction x as described above. If a magnification of the eyepiece 14 is small, the birefringence plate 37 need not diffuse pixels.

Figure 6:
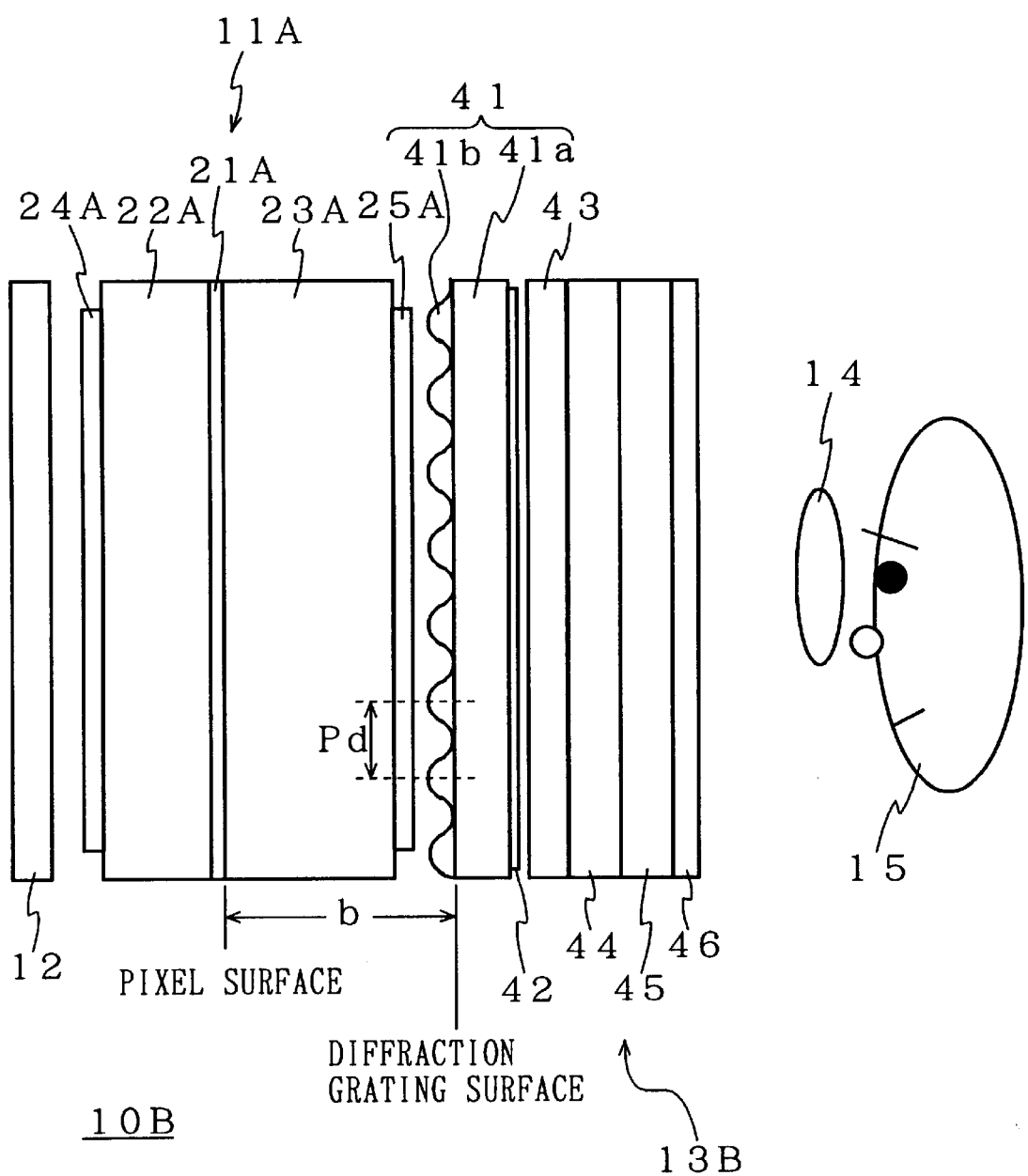
FIG. 6 is a schematic diagram showing an electronic viewfinder according to a third embodiment of the present invention.

FIG. 6 shows an electronic viewfinder (EVF) 10B according to a third embodiment of the present invention. In FIG. 6, like elements and parts corresponding to those of FIG. 4 are marked with the same references and therefore need not be described in detail.

As shown in FIG. 6, this electronic viewfinder 10B comprises the liquid-crystal display device (LCD) 11A serving as the display device having the matrix-like pixel pattern, the backlight 12 for brightening the display of the liquid-crystal display device 11A by illuminating the liquid-crystal display device 11A from behind, a diffuser 13B disposed on the liquid-crystal display device 11A in an opposing relation to the viewer side as an optical filter for diffusing each pixel of the liquid-crystal display device 11A, and the eyepiece 14 disposed on the viewer side of the diffuser 13B.

The diffuser 13B comprises a diffraction grating 41 whose diffraction surface 41b made of a photosensitive resin, for example, is formed on a glass substrate 41a in an opposing relation to the liquid-crystal display device 11A, a quarter-wave phase difference film (quarter-wave plate) 42 deposited on the surface of the diffraction grating 41 in an opposing relation to the eyepiece 14 side so as to convert linearly-polarized light (linearly-polarized wave) into circularly-polarized light (circularly-polarized wave), a birefringence plate 43 disposed on the quarter-wave phase difference film 42 in an opposing relation to the eyepiece 14, and birefringence plates 44, 45, 46 sequentially deposited on the birefringence plate 43 in an opposing relation to the eyepiece 14.

The birefringence plates 43 through 46 are each made of a birefringence material having a high refractive index anisotropy, e.g. lithium niobate (LN). Then, the birefringence plates 43, 46 are treated on their surfaces in which they are exposed by surface reflection preventing thin film treatment (AR coating) so that a transmittance can be prevented from being deteriorated because the transmittances of the birefringence plates 43, 46 tend to be deteriorated due to large surface reflection. Furthermore, a color blur can be removed by flattening the transmittance within the visible light band by adjusting the wavelength characteristic of the AR coating.

In this embodiment, the diffraction grating 41, the quarter-wave phase difference film 42 and the birefringence plates 43 through 46 composing the diffuser 13B are arranged as shown on the table 6 below:

TABLE 6

| | shift amount | shift direction | thickness | grating pitch Pd | optical length b | phase delay axis |
|---|---|---|---|---|---|---|
| (1) diffraction grating 41 | 28 μm | 0° | — | 19.8 μm | 1.00 mm | — |

TABLE 6-continued

| | shift amount | shift direction | thickness | grating pitch Pd | optical length b | phase delay axis |
|---|---|---|---|---|---|---|
| (2) quarter-wave phase difference film 42 | — | — | — | — | — | 45° |
| (3) birefringence plate 43 (lithium niobate) | 17.5 μm | 90° | 0.453 mm | — | — | — |
| (4) birefringence plate 44 (lithium niobate) | 24.7 μm | 45° | 0.64 mm | — | — | — |
| (5) birefringence plate 45 (lithium niobate) | 24.7 μm | −45° | 0.64 mm | — | — | — |
| (6) birefringence plate 46 (litnium niobate) | 14 μm | 0° | 0.362 mm | — | — | — |

Specifically, as shown on the above-mentioned table 6, the grating surface 41b of the diffraction grating 41 is formed in such a manner that the shift direction becomes 0° and that the grating pitch Pd becomes 19.8 μm. Also, the diffraction grating 42 is disposed in such a manner that the optical length b from the pixel surface to the diffraction grating surface becomes 1.00 mm. Thus, the diffraction grating 41 becomes able to diffuse each pixel into three points in the horizontal direction x in such a manner that the shift amount becomes 28 μm (⅓ of the same color pixel pitch POx in the horizontal direction x).

With respect to the birefringence plate 43, lithium niobate is used as the birefringence material thereof. An optical axis angle of the birefringence plate 43 is set in such a manner that the direction in which the birefringence plate 43 shifts linearly-polarized component of the vertical direction y of light (circularly-polarized light) outputted from the quarter-wave phase difference film 42 with the delay phase axis of 45° becomes 90°. Also, the birefringence plate 43 has a thickness of 0.453 mm. Thus, the birefringence plate 43 becomes able to diffuse each pixel into two points in the vertical direction y in such a manner that the shift amount becomes 17.5 μm (¼ of the same color pixel pitch POy of the vertical direction y).

With respect to the birefringence plate 44, lithium niobate is used as the birefringence material. An optical axis angle of the birefringence plate 44 is set in such a manner that the direction in which the birefringence plate 44 shifts the linearly-polarized component of the direction of 45° of the light outputted from the birefringence plate 43 becomes 90°. Also, the birefringence plate 44 has a thickness of 0.64 mm. Thus, the birefringence plate 44 becomes able to diffuse each pixel into two points in the direction of 45° in such a manner that the shift amount becomes 24.7 μm (√2̄/4 of the same color pixel pitch POy in the vertical direction y).

Further, with respect to the birefringence plate 45, lithium niobate is used as the birefringence material. An optical axis angle of the birefringence plate 45 is set in such a manner that the direction in which the birefringence plate 45 shifts the linearly-polarized component of −45° in the output light of the birefringence plate 44 becomes −45°. Also, the birefringence plate 45 has a thickness of 0.64 mm. Thus, the birefringence plate 45 becomes able to diffuse each pixel into two points in the direction of −45° in such a manner that the shift amount becomes 24.7 μm (√2̄/4 of the same color pixel pitch POy in the vertical direction y).

Furthermore, with respect to the birefringence plate 46, lithium niobate is used as the birefringence material. An optical axis angle of the birefringence plate 46 is set in such a manner that the direction in which the birefringence plate 46 shifts the linearly-polarized component of the horizontal direction x in the output light of the birefringence plate 45 becomes 0°. Also, the birefringence plate 46 has a thickness of 0.362 mm. Thus, the birefringence plate 46 becomes able to diffuse each pixel into two points in the horizontal direction x in such a manner that the shift amount becomes 14 μm (⅙ of the same color pixel pitch POx in the horizontal direction x).

An operation of the electronic viewfinder 10B will be described next.

Light outputted from the backlight 12 is introduced into the optical filter 10B from the rear of the liquid-crystal display device 11A. In this case, the sheet polarizer 24A converts the light outputted from the backlight 12 into linearly-polarized light, and the liquid-crystal layer portion 21A rotates a plane of polarization of each pixel portion of this linearly-polarized light with a magnitude corresponding to the level of pixel signals composing a video signal. As a consequence, the sheet polarizer 25A of the liquid-crystal display device 11A emits linearly-polarized light (polarizing direction is 90°) of which the intensity is modulated at every pixel, and this liquid-crystal display device 11A displays an image corresponding to the video signal.

Then, in the electronic viewfinder 10B shown in FIG. 6, the diffraction grating 41 comprising the diffuser 13B diffuses each pixel of the liquid-crystal display device 11A into three pixels in the horizontal direction x in such a manner that the shift amount (length between adjacent diffusion points) becomes ⅓ of the same color pixel pitch POx in the horizontal direction x.

The birefringence plate 43 diffuses the pixels, which had been diffused by the diffraction grating 41, into two pixels in the vertical direction y in such a manner that the shift amount becomes ¼ of the same color pixel pitch POy in the vertical direction y. The birefringence plate 44 diffuses the pixels, which had been diffused by the birefringence plate 43, into two pixels in the direction of 45° in such a manner that the shift amount becomes √2̄/4 of the same color pixel pitch POy of the vertical direction y in the direction of 45°. Moreover, the birefringence plate 45 receives the pixels diffused by the birefringence plate 44, and diffuses the linearly-polarized component of the direction of −45° in such a manner that the shift amount becomes √2̄/4 of the same color pixel pitch POy of the vertical direction y in the direction of −45°. Therefore, the three birefringence plates 43 through 45 diffuse the pixels, which had been diffused by the diffraction grating 41, into four pixels in the vertical direction y in such a manner that the shift amount thereof becomes ¼ of the same color pixel pitch POy of the vertical direction y.

Furthermore, the birefringence plate 46 diffuses the pixels, which had been diffused by the birefringence plates 43 through 45, into two pixels in the horizontal direction x in such a manner that the shift amount becomes ⅙ of the same color pixel pitch POx of the horizontal direction x. Thus, the diffuser 13B diffuses each pixel of the liquid-crystal display device 11A into 24 pixels, and the viewer 15 can watch the resultant diffused pixels through the eyepiece 14.

FIGS. 7A through 7G are schematic diagrams used to explain the principle in which pixels are diffused by the diffuser 13B.

Figure 7:
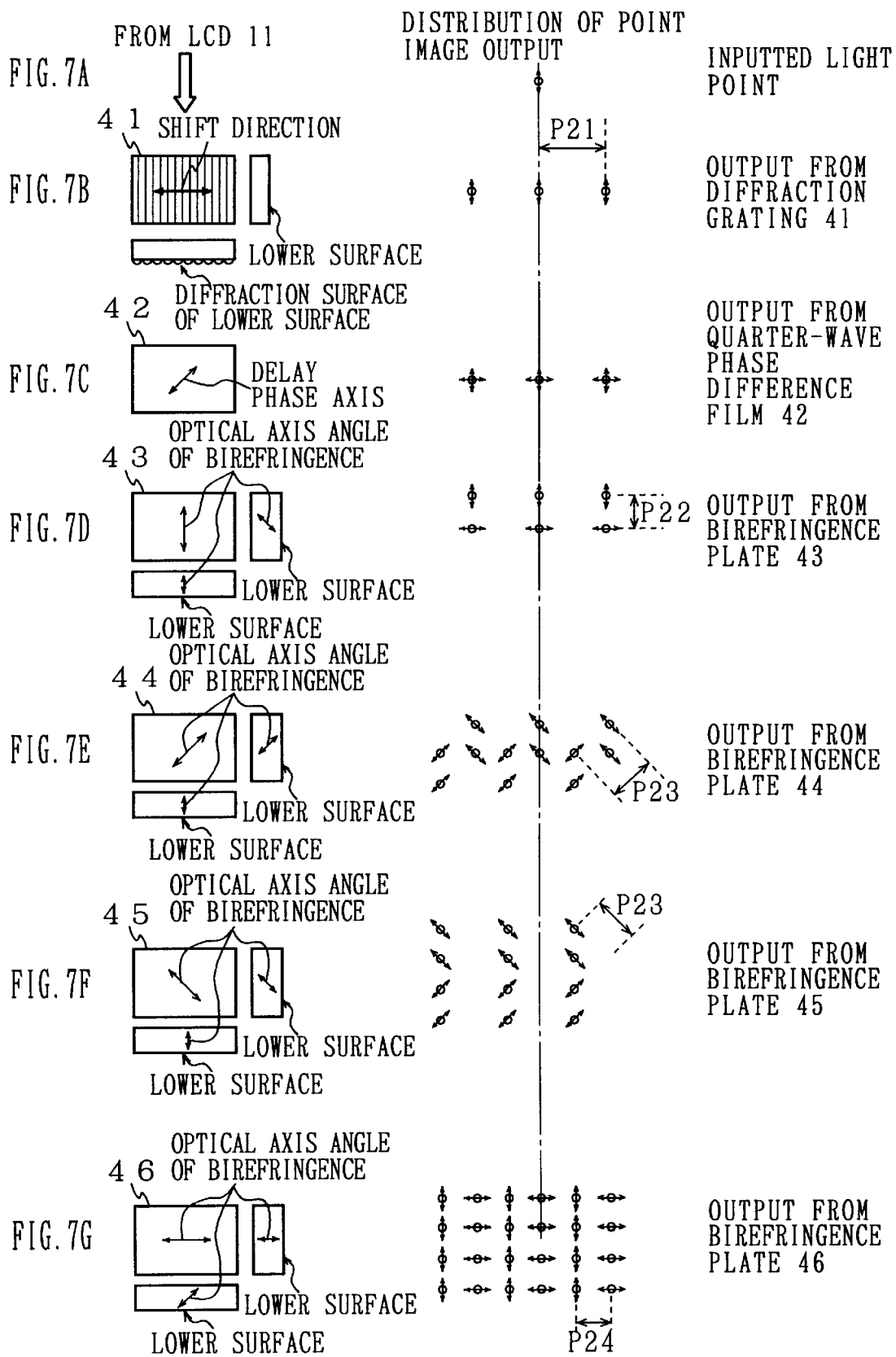
FIGS. 7A through 7G are schematic diagrams showing a principle of pixel diffusion according to the third embodiment of the present invention.

A point image output of an inputted light point (pixel of the liquid-crystal display device 11A) shown in FIG. 7A is diffused by the diffraction grating 41 into three points in the horizontal direction x by a shift amount P21 (=POx/3) as shown in FIG. 7B. In this case, although the arrow of the point image output shows the polarizing direction, the direction in which the diffraction grating 41 polarizes the point image output becomes the direction of 90° similarly to the direction in which the point image output of the input light point is polarized. Then, the linearly-polarized light outputted from the diffraction grating 41 is converted into circularly-polarized light by the quarter-wave phase difference film 42 having the delay phase axis inclined with an inclination angle of 45° with respect to the polarizing direction as shown in FIG. 7C.

As shown in FIG. 7D, the birefringence plate 43 receives the point image output of the quarter-wave phase difference film 42 and shifts only the linearly-polarized component of the vertical direction y by a shift amount P22 (=POy/4) in the vertical direction y. As a consequence, the point image output of the quarter-wave phase difference film 42 is diffused into two points.

As shown in FIG. 7E, the birefringence plate 44 receives the point image output of the birefringence plate 43 and shifts only a linearly-polarized component of the direction of 45° by a shift amount P23 (=POy·√2/4) in the direction of 45°. As a consequence, the point image output from the birefringence plate 43 is diffused into two points. Then, of the point image output outputted from the birefringence plate 44, pixels composed of a linearly-polarized component of the direction of 45° is shifted by the birefringence plate 45 by the shift amount P23 (=POy·√2/4) in the direction of −45° as shown in FIG. 7E. That is, no pixels are diffused by the birefringence plate 45.

Furthermore, as shown in FIG. 7G, the birefringence plate 46 receives the point image output of the birefringence plate 45 and shifts only the linearly-polarized component of the horizontal direction x by a shift amount P24 (=POy/6) in the horizontal direction x with the result that the point image output from the birefringence plate 45 is diffused into two points. Thus, the diffuser 13B diffuses each pixel of the liquid-crystal display device 11A into 24 pixels.

As described above, in the electronic viewfinder 10B shown in FIG. 6, since each pixel of the liquid-crystal display device 11A is diffused by the diffuser 13B into 24 pixels, the matrix-like pixel pattern and the same color dot cycle are optically erased by the diffusion of pixels, thereby resulting in a quality of picture being improved. In this case, since the diffuser 13B is arranged by a combination of diffraction grating and birefringence plates similarly to the electronic viewfinder 10A shown in FIG. 4, it is possible to make an optimum design for diffusing pixels while suppressing the occurrence of moiré. Moreover, in the diffuser 13B of the electronic viewfinder 10B shown in FIG. 6, the quarter-wave phase difference film 42 is deposited only to the diffraction grating 41 in an opposing relation to the eyepiece 14. There is then the advantage that the number of quarter-wave phase difference films used in the diffuser 13B can be decreased to make the diffuser 13 inexpensive as compared with the diffuser 13A in the electronic viewfinder 10A shown in FIG. 4.

Incidentally, in the diffuser 13B of the electronic viewfinder 10B shown in FIG. 6, although the birefringence plate 46 is adapted to further diffuse the respective pixels, which had been diffused by the birefringence plates 43 through 45, into two pixels in the horizontal direction x, if the magnification of the eyepiece 14 is small, it is not necessary to diffuse pixels by the birefringence plate 46.

Figure 8:
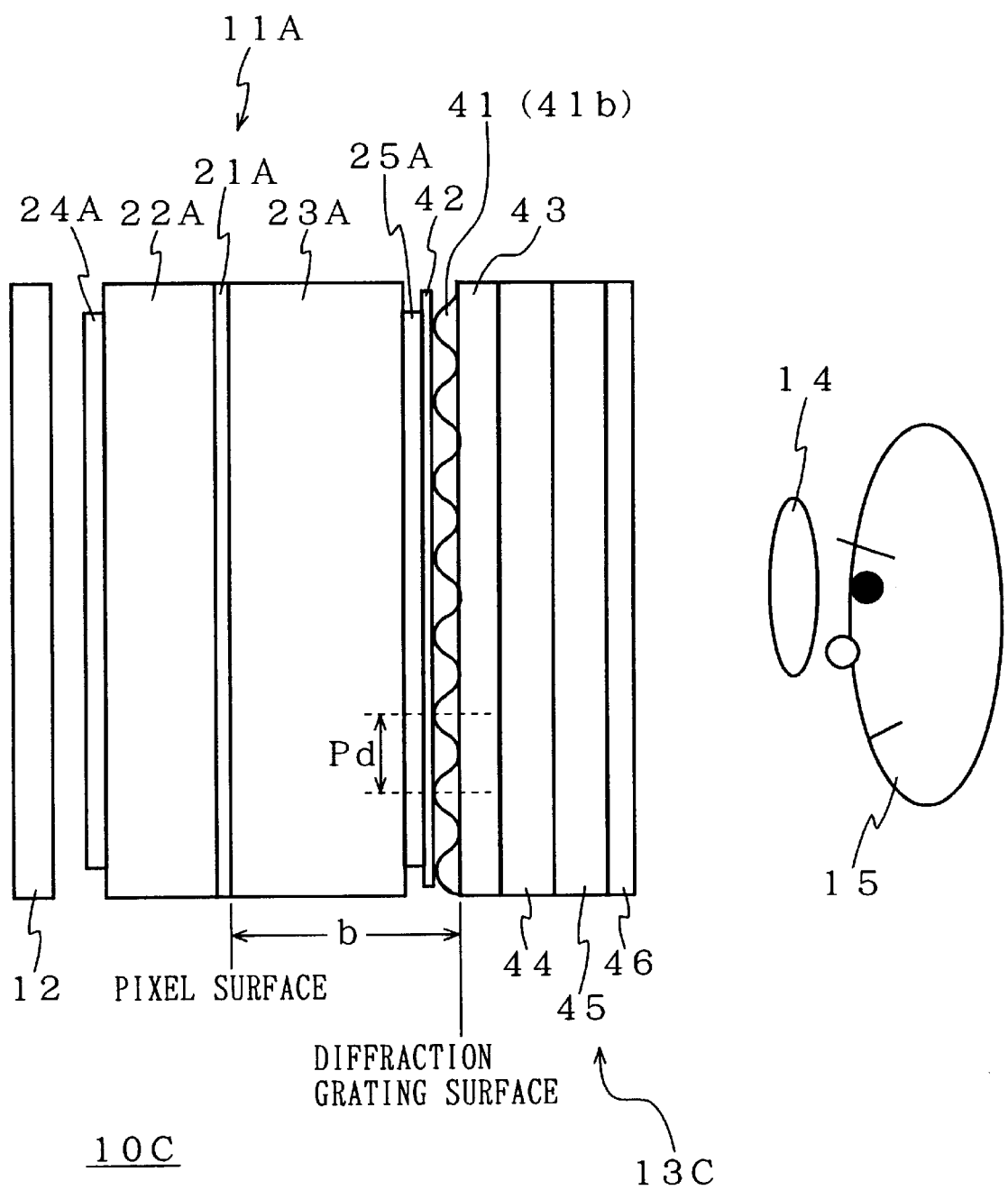
FIG. 8 is a schematic diagram showing an electronic viewfinder according to a fourth embodiment of the present invention.

FIG. 8 schematically illustrates an electronic viewfinder (EVF) 10C according to a fourth embodiment of the present invention. In FIG. 8, elements and parts identical to those of FIG. 6 are marked with the same references and therefore need not be described in detail.

As shown in FIG. 8, the electronic viewfinder 10C comprises the liquid-crystal display (LCD) device 11A serving as the display device having the matrix-like pixel pattern, the backlight 12 for brightening the display of the liquid-crystal display device 11A by illuminating the liquid-crystal display device 11A from behind, a diffuser 13C disposed in the liquid-crystal display device 11A in an opposing relation to the viewer side as an optical filter for diffusing each pixel of the liquid-crystal display device 11A and the eyepiece (magnifying lens) 14 located in the diffuser 13C in an opposing relation to the viewer side.

As shown in FIG. 8, the diffuser 13C comprises a combination of the quarter-wave phase difference plate 42 deposited on the sheet polarizer 25A of the liquid-crystal display device 11A in an opposing relation to the eyepiece 14 side, the birefringence plate 43 disposed on the quarter-wave phase difference film 42 in an opposing relation to the eyepiece 14, and the birefringence plates 44, 45, 46 sequentially deposited on the birefringence plate 43 in an opposing relation to the eyepiece 14 side. Then, the grating surface 41b comprising the diffraction grating 41 is made of a photosensitive resin, for example, and is deposited on the birefringence plate 43 in an opposing relation to the quarter-wave phase difference film 42 side. In the diffuser 13C shown in FIG. 8, the diffraction grating 41 and the quarter-wave phase difference film 42 in the diffuser 13B in the electronic viewfinder 10B shown in FIG. 6 are disposed at the opposite position, and a function of each constituent of the diffuser 13C is similar to that of the diffuser 13B.

An operation of the electronic viewfinder 10C shown in FIG. 8 will be described next.

Light outputted from the backlight 12 is introduced into the electronic viewfinder 10C from the rear of the liquid-crystal display device 11A. In this case, the sheet polarizer 24A polarizes the light outputted from the backlight 12 to provide linearly-polarized light, and then the liquid-crystal layer portion 21A rotates a plane of polarization of each pixel portion of this linearly-polarized light with a magnitude corresponding to the level of pixel signals, each composing the video signal. Therefore, the sheet polarizer 25A of the liquid-crystal display device 11A emits linearly-polarized light (polarizing direction is 90°) which is modulated in intensity at every pixel, and the liquid-crystal display device 11A displays an image corresponding to the video signal.

Then, in the electronic viewfinder 10C shown in FIG. 8, the diffuser 13C diffuses each pixel of the liquid-crystal display device 11A, and the viewer 15 can view such diffused pixels through the eyepiece 14.

FIGS. 9A through 9G are schematic diagrams used to explain the principle in which the diffuser 13C diffuses pixels.

Figure 9:
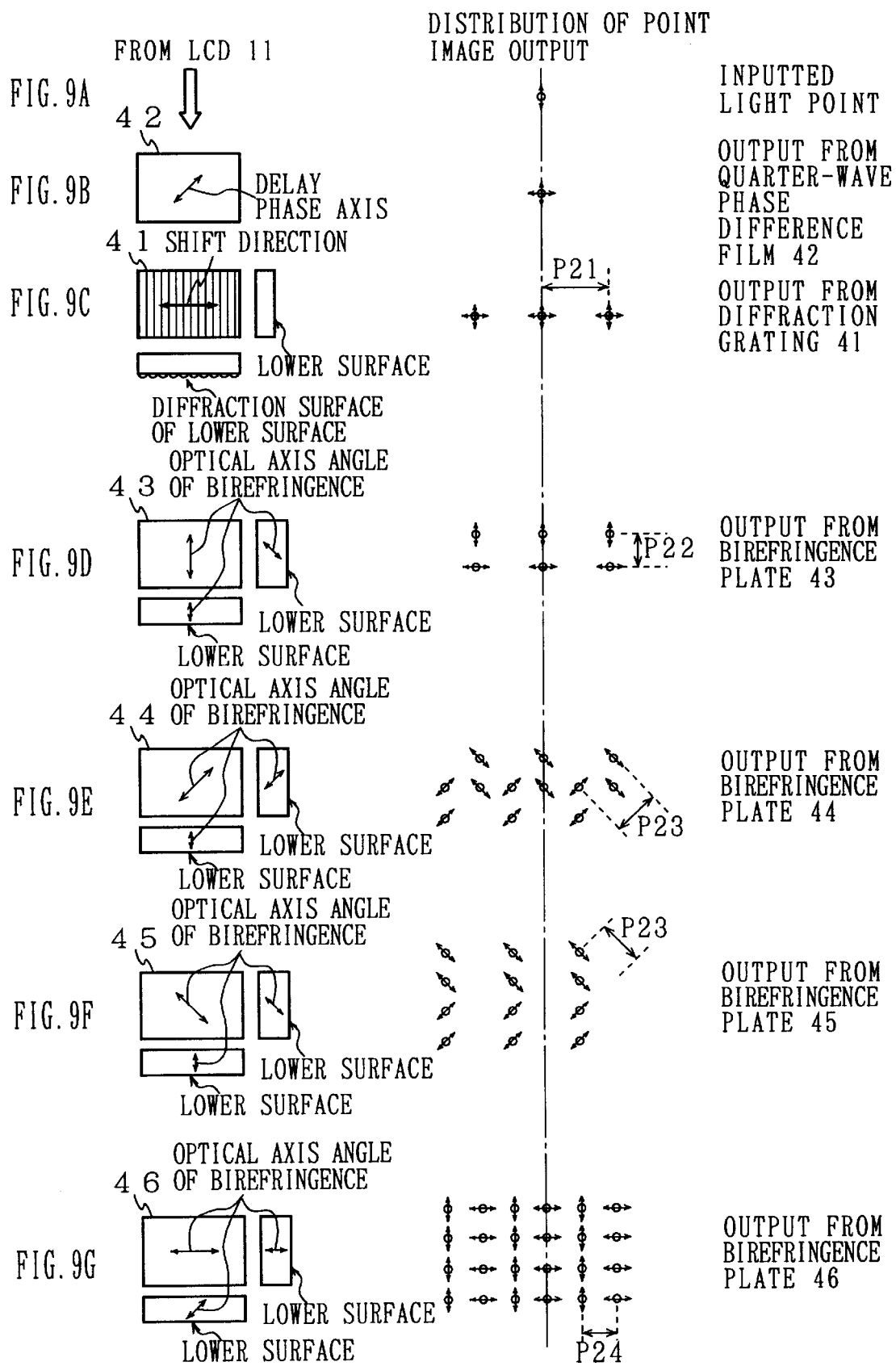
FIGS. 9A through 9G are schematic diagrams showing a principle of pixel diffusion according to the fourth embodiment of the present invention.

A point image output (linearly-polarized light) of an input light point (pixel of the liquid-crystal display device 11A) shown in FIG. 9A is converted into circularly-polarized light by the quarter-wave phase difference film 42 having the delay phase axis inclined with an inclination angle of 45° relative to the polarizing direction as shown in FIG. 9B. Then, as shown in FIG. 9C, the diffraction grating 41 diffuses the point image output of the quarter-wave phase difference film 42 into three points in the horizontal direction x by the shift amount P21 (=Pox/3) as shown in FIG. 9C.

Also, as shown in FIG. 9D, the birefringence plate 43 receives the point image output of the diffraction grating 41 and shifts only the linearly-polarized component of the vertical direction y by the shift amount P22 (=POy/4) in the vertical direction y with the result that the point image output of the diffraction grating 41 is diffused into two points.

Also, as shown in FIG. 9E, the birefringence plate 44 receives the point image output of the birefringence plate 43 and shifts only the linearly-polarized component of 45° by the shift amount P23 (=POy·√2/4) in the direction of 45° with the result that the point image output of the birefringence plate 43 is diffused into two points. Then, as shown in FIG. 9F, the birefringence plate 45 receives the point image output outputted from the birefringence plate 44 and pixels composed of the linearly-polarized component of the direction of −45° by the shift amount P23 (=POy·√2/4) in the direction of −45°. In other words, no pixels are diffused by the birefringence plate 45.

Furthermore, as shown in FIG. 9G, the birefringence plate 46 receives the point image output of the birefringence plate 45 and shifts only the linearly-polarized component of the horizontal direction x by the shift amount P24 (=POy/6) in the horizontal direction x with the result that the point image output of the birefringence plate 45 is diffused into two points. Thus, the diffuser 13C diffuses each pixel of the liquid-crystal display device 11A into 24 pixels.

As described above, in the electronic viewfinder 10C shown in FIG. 8, since the diffuser 13C diffuses each pixel of the liquid-crystal display device 11 into 24 pixels, the matrix-like pixel pattern and the same color dot cycle are optically erased by the diffusion of pixels, and hence a quality of picture can be improved. In this case, the electronic viewfinder 10C comprises a combination of the diffraction grating and the birefringence plates similarly to the electronic viewfinder 10B shown in FIG. 6, and can achieve action and effects similar to those of the electronic viewfinder 10B shown in FIG. 6.

Figure 10:
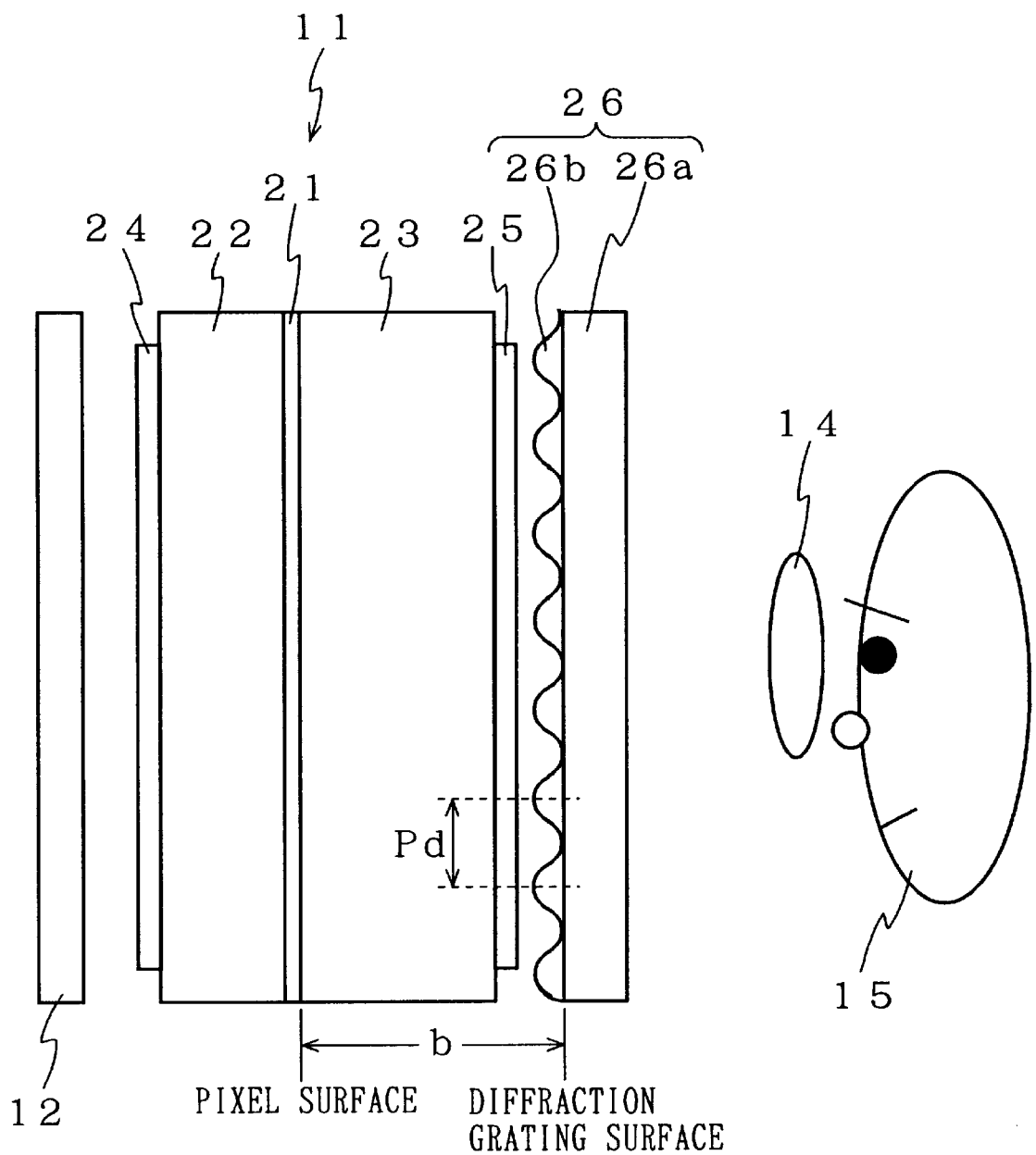
FIG. 10 is a schematic diagram showing an example of an electronic viewfinder using a diffraction grating as a diffuser.

FIG. 10 is a schematic diagram showing an electronic viewfinder 70 using a diffraction grating as a diffuser according to the related art. In FIG. 10, elements and parts identical to those of FIG. 1 are marked with the same references.

As shown in FIG. 10, the electronic viewfinder 70 includes the liquid-crystal display device 11 serving as the display device having the matrix-like pixel pattern, the backlight 12 for brightening the display of the liquid-crystal display device 11 by illuminating the liquid-crystal display device 11 from behind, the diffraction grating 26 located in the viewer side of the liquid-crystal display device 11 as the optical filter composing the diffuser for diffusing each pixel of the liquid-crystal display device 11, and the eyepiece (magnifying lens) 14 disposed on the viewer 15 side of the diffraction grating 26.

As is known well, the liquid-crystal display device 11 comprises the liquid-crystal layer portion 21 in which a common electrode and pixel electrodes are disposed across the liquid-crystal layer and in which the color filters of R, G, B (red, green, blue) are disposed at a predetermined repetitive cycle in response to the respective pixel electrodes, the glass substrates 22, 23 disposed across the liquid-crystal layer portion 21, the sheet polarizer 24 deposited on the glass substrate 22 in an opposing relation to the backlight 12 side, and the sheet polarizer 25 deposited on the glass substrate 23 in an opposing relation to the diffraction grating 26 side. Then, the diffraction grating 26 having the grating surface 26b made of the photosensitive resin, for example, is deposited on the glass substrate 26a in an opposing relation to the liquid-crystal display device 11 side.

An operation of the electronic viewfinder 70 shown in FIG. 10 will be described next. Light outputted from the backlight 12 is introduced into the electronic viewfinder from the rear of the liquid-crystal display device 11. In this case, the sheet polarizer 24 polarizes the light outputted from the backlight 12 to provide linearly-polarized light, and the liquid-crystal layer portion 21 rotates a plane of polarization of each pixel portion of this linearly-polarized light with a magnitude corresponding to the level of pixel signals composing a video signal. As a consequence, the sheet polarizer 25 of the liquid-crystal display device 11 emits linearly-polarized light (direction of polarization is 45°) which is modulated in intensity at every pixel, and the liquid-crystal display device 11 displays an image corresponding to the video signal.

Then, the diffraction grating 26 diffuses each pixel of the liquid-crystal display device 11 into three pixels in the horizontal direction x in such a manner that the shift amount (length between adjacent diffusion points) becomes ⅓ of the same color pixel pitch POx of the horizontal direction x. The viewer 15 can watch the pixels thus diffused through the eyepiece 14. Since the matrix-like pixel pattern and the same color dot cycle are optically erased by the diffusion of pixels, it is possible to improve a quality of picture.

The shift amount P of the diffraction grating is calculated based on the equation (6) as described above. When the shift amount P decreases, the grating pitch Pd increases. Therefore, if it is intended to reduce the grating pitch Pd in order to prevent the occurrence of moiré, it is necessary to reduce the optical length b by placing the mounting position of the diffraction grating near to the liquid-crystal display device. However, in the electronic viewfinder 70 shown in FIG. 10, the optical length b cannot be reduced because the glass substrate 23 comprising the liquid-crystal display device 11 in the viewer side cannot be reduced in thickness.

Figure 11:
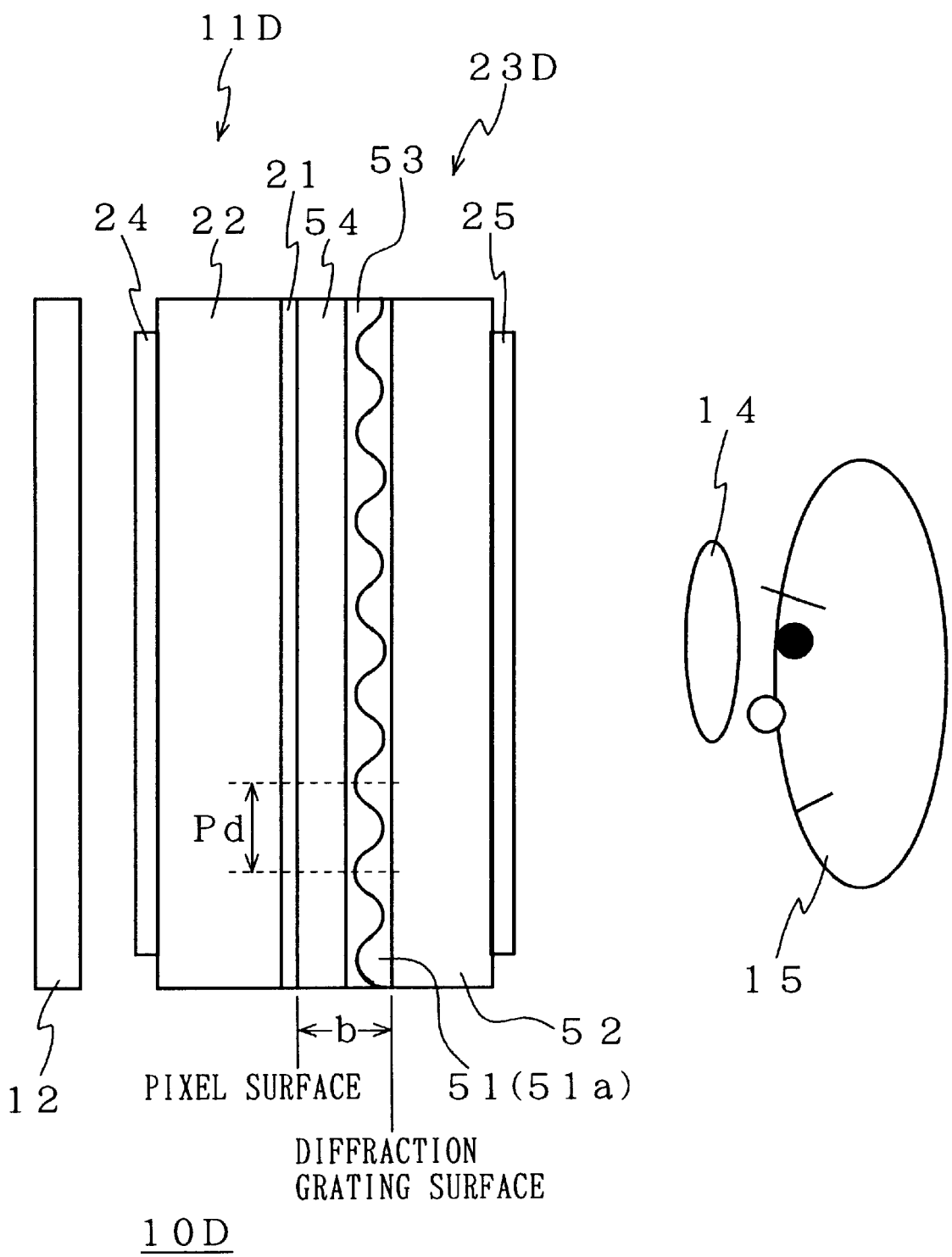
FIG. 11 is a schematic diagram showing an electronic viewfinder according a fifth embodiment of the present invention.

FIG. 11 is a schematic diagram showing an electronic viewfinder (EVF) 10D according to a fifth embodiment of the present invention. In FIG. 11, elements and parts corresponding to those of FIG. 1 are marked with the same reference and therefore need not be described in detail.

As shown in FIG. 11, the electronic viewfinder 10D comprises a liquid-crystal display device 11D serving as a display device having a matrix-like pixel pattern, the backlight 12 for brightening the display of the liquid-crystal display device 11D by illuminating the liquid-crystal display device from behind, and the eyepiece 14 (magnifying lens) disposed on the side from which the liquid-crystal display device 11D can be viewed.

The liquid-crystal display device 11 comprises the liquid-crystal layer portion 21 in which a cotton electrode and pixel electrodes are disposed across the liquid-crystal layer and in which color filters of R, G, B (red, green, blue) are disposed at a predetermined repetitive cycle in response to the respective pixel electrodes, glass substrates 22, 23D disposed across the liquid-crystal layer portion 21, the sheet polarizer 24 deposited on the glass substrate 22 in an opposing relation to the backlight 12 side, and the sheet polarizer 25 deposited on the glass substrate 23D in an opposing relation to the eyepiece 14.

Further, a diffraction grating 51 is integrally formed on the glass substrate (CF glass: color filter glass) 23D. Specifically, a grating surface 51a made of a suitable material such as a photosensitive resin is formed on a glass plate 52 so as to form the diffraction grating 51, and a thin plate glass 54 is attached to the grating surface 51a by use of an adhesive transparent resin 53 having a refractive index different from that of the grating surface 51a, thereby resulting in the glass substrate 23D being formed.

An operation of the electronic viewfinder 10D shown in FIG. 11 will be described next. Light outputted from the backlight 12 is introduced into the electronic viewfinder 10D from the rear of the liquid-crystal display device 11D. In this case, the sheet polarizer 24 polarizes the outputted light from the backlight 12 to provide linearly-polarized light. Then, the liquid-crystal layer portion 21 receives each pixel portion of this linearly-polarized light and rotates a plane of polarization with a magnitude corresponding to the signal level of pixel signals composing a video signal. Also, the diffraction grating 51 diffuses each pixel portion of this linearly-polarized light into three points in the horizontal direction x in such a manner that the shift amount (length between adjacent diffusion points) becomes ⅓ of the same color pixel pitch POx of the horizontal direction x, for example.

As a result, the sheet polarizer 25 of the liquid-crystal display device 11D emits linearly-polarized light which is modulated in intensity at every pixel and which is then diffused, and the liquid-crystal display device 11D displays an image corresponding to the video signal. Therefore, according to the electronic viewfinder 10D shown in FIG. 11, the matrix-like pixel pattern and the same color dot cycle can be optically erased, and hence a quality of picture can be improved.

According to the electronic viewfinder 10D shown in FIG. 11, since the diffraction grating 51 is integrally formed on the glass substrate (CF glass) 23D comprising the liquid-crystal display device 11D, the optical length b can be reduced compared with the electronic viewfinder 70 shown in FIG. 10. Therefore, even when the shift amount is small, the grating pitch Pd can be reduced. There is then the advantage that a moiré can be effectively suppressed from occurring.

While the optical filter (diffuser) is arranged by a combination of one diffraction grating and one or a plurality of diffraction gratings as described above, the present invention is not limited thereto, and a plurality of diffraction gratings may be used so long as a moiré does not become conspicuous. Moreover, while each pixel is diffused by the diffraction grating into three points as described above, the number of diffusion points is not limited to three, and each pixel may be diffused into five points, for example. Moreover, while the display device having the matrix-like pixel pattern is the liquid-crystal display device as described above, the present invention is not limited thereto, and a flat-panel display such as a plasma display may be considered as other display devices having the matrix-like pixel pattern.

While the grating axis of the diffraction grating 26 is rotated 8° from the horizontal direction x in order to decrease a moiré in the first embodiment, the present invention is not limited thereto, and it is possible to decrease a moiré by lowering intensities of +first-order diffraction light and −first-order diffraction light or by correcting a shift amount.

According to the optical filter and the image display apparatus of the present invention, the optical filter (diffuse) is arranged by a combination of the diffraction grating and the birefringence plates, it is possible to make an optimum design for diffusing pixels while suppressing the occurrence of moiré. That is, since the diffraction grating is adapted to diffuse pixels with a large shift amount, a total thickness of birefringence plates can be suppressed from increasing and the optical filter can be produced inexpensively as compared with an optical filter which diffuses pixels by use of only birefringence plates. Moreover, since the diffraction grating is adapted to diffuse pixels with a large shift amount, the grating pitch can be narrowed, and hence it is possible to suppress the occurrence of moiré.

Further, since the grating pitch of the diffraction grating is made smaller than ½ of a same color pixel cycle of a single-chip color display device in which color filters of primary three colors are arrayed at a predetermined repetitive cycle in response to respective pixels, it is possible to satisfactorily prevent a moiré from occurring.

Furthermore, according to the liquid-crystal display device of the present invention, since the diffraction grating for diffusing pixels is unitarily formed into one transparent substrate in an opposing relation to the viewer side of a pair of substrates disposed across the liquid-crystal layer portion, it is possible to decrease the optical length between the pixel surface and the diffraction grating surface. Therefore, even when the shift amount is small, the grating pitch can be narrowed, and hence the occurrence of moiré can be suppressed effectively.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An optical filter disposed on a display device having a matrix-like pixel pattern in an opposing relation to a viewer side of said display device, comprising:

at least one diffraction grating; and at least one bifringence plate cooperating with each other to diffuse pixels of said display device, wherein said display device is a single-chip color display device in which color filters of three primary colors are arrayed at a predetermined repetitive color pixel cycle in response to respective pixels, and a grating pitch of said diffraction grating is made smaller than ½ of the color pixel cycle of said display device.

2. An optical filter disposed on a display device having a matrix-like pixel pattern in an opposing relation to a viewer side of said display device, comprising:

at least one diffraction grating; and at least one bifringence plate cooperating with each other to diffuse pixels of said display device, wherein said display device is a single-chip color display device in which color filters of three primary colors are arrayed at a predetermined repetitive cycle in response to respective pixels, said optical filter comprises a combination of one diffraction grating and one birefringence plate, said one diffraction grating diffuses each pixel of said display device into three pixels in the vertical direction in such a manner that a first length between adjacent diffusion points becomes ⅓ of a same color pixel pitch of a vertical direction of said display device, and said one birefringence plate diffuses each diffused pixel into two pixels in the horizontal direction in such a manner that a second length between adjacent diffusion points becomes ½ of a same color pixel pitch of a horizontal direction of said display device.

3. An optical filter disposed on a display device having a matrix-like pixel pattern in an opposing relation to a viewer side of said display device, comprising:

at least one diffraction grating; and at least one bifringence plate cooperating with each other to diffuse pixels of said display device, wherein said display device is a single-chip color display device in which color filters of three primary colors are arrayed at a predetermined cycle in response to respective pixels of said display device, said optical filter further including one diffraction grating and at least two birefringence plates, said one diffraction grating diffuses each pixel of said display device into three pixels in the horizontal direction in such a manner that a first length between adjacent diffusion point becomes ⅓ of a horizontal direction of said display device, and said at least two birefringence plates diffuse each diffused pixel into four pixels in the vertical direction in such a manner that a second length between adjacent diffusion points becomes ¼ of a same color pixel pitch of a vertical direction of said display device.

4. The optical filter according to claim 3, further comprising an additional birefringence plate wherein said additional birefringence plate diffuses said each pixel, which had been diffused into four pixels in said vertical direction, into two pixels in the horizontal direction in such a manner that a third length between adjacent diffusion points becomes ½ of said first length between adjacent diffusion points.

5. An image display apparatus comprising:

a display device having a matrix-like pixel pattern; and an optical filter disposed in said display device in an opposing relation to a viewer side of said display device, said optical filter including at least one diffraction grating and at least one birefringence plate cooperating with each other to diffuse pixels of said display device, wherein said display device is a single-chip color display device in which color filters of three primary colors are arrayed at a predetermined repetitive color pixel cycle in response to respective pixels, and a grating pitch of said diffraction grating is made smaller than ½ of said color pixel cycle of said display device.

6. The image display apparatus as claimed in claim 5, wherein said display device is a liquid-crystal display device.

7. An image display apparatus comprising:

a display device having a matrix-like pixel pattern; and an optical filter disposed in said display device in an opposing relation to a viewer side of said display device, said optical filter including at least one diffraction grating and at least one birefringence plate cooperating with each other to diffuse pixels of said display device, wherein said display device is a single-chip color display device in which color filters of three primary colors are arrayed at a predetermined repetitive cycle in response to respective pixels of said display device, said optical filter including one diffraction grating and one birefringence plate, said one diffraction grating diffuses each pixel of said display device into three pixels in the vertical direction in such a manner that a first length between adjacent diffusion points becomes ⅓ of a same color pixel pitch of a vertical direction of said display device, and said one birefringence plate diffuses each diffused pixel into two pixels in the horizontal direction in such a manner that a second length between adjacent diffusion points becomes ½ of a same color pixel pitch of a horizontal direction of said display device.

8. An image display device comprising:

a display device having a matrix-like pixel pattern; and an optical filter disposed in said display device in an opposing relation to a viewer side of said display device, said optical filter including at least one diffraction grating and at least one birefringence plate cooperating with each other to diffuse pixels of said display device, wherein said display device is a single-chip color display device in which color filters of three primary colors are arrayed at a predetermined repetitive cycle in response to respective pixels of said display device, said optical filter includes one diffraction grating and at least two birefringence plates, said one diffraction grating diffuses each pixel of said display device into three pixels in the horizontal direction in such a manner that a first length between adjacent diffusion points becomes ⅓ of a same color pixel pitch of a horizontal direction of said display device, and said at least two birefringence plates diffuse each diffused pixel into four pixels in the vertical direction in such manner that a second length between adjacent diffusion points becomes ¼ of a same color pixel pitch of a vertical direction of said display device.

9. The image display apparatus as claimed in claim 8, wherein said optical filter further comprises an additional birefringence plate that diffuses said each pixel, which had been diffused into four pixels in the vertical direction, into two pixels in the horizontal direction in such a manner that a length between adjacent diffusion points becomes ½ of said first length between adjacent diffusion points.

10. A liquid-crystal display device comprising:

a liquid-crystal layer portion;

a first transparent substrate disposed on one side of said liquid-crystal layer portion;

a glass plate disposed on another side of said liquid crystal layer portion, said glass plate having a thickness less than a thickness of said first transparent substrate;

a second transparent substrate;

a diffraction grating integrally formed into one surface of said second transparent substrate in an opposing relation to a viewer side of the liquid-crystal display for diffusing pixels; and a transparent adhesive layer applied to a surface of said glass plate for bonding said diffraction grating and said second transparent substrate to said glass plate.

* * * * *